US012321237B2

(12) United States Patent
Regni et al.

(10) Patent No.: US 12,321,237 B2
(45) Date of Patent: Jun. 3, 2025

(54) METHOD AND APPARATUS FOR MONITORING STORAGE SYSTEM REPLICATION (71) Applicant: SCALITY, S.A., Paris (FR)

(72) Inventors: Giorgio Regni, Albany, CA (US); Vianney Rancurel, Sausalito, CA (US); Rahul Reddy Padigela, Walnut Creek, CA (US); Jonathan Gramain, San Francisco, CA (US); Taylor McKinnon, Oakland, CA (US); Artem Bakalov, Kirkland, WA (US)

(73) Assignee: Scality, S.A., Paris (FR)

( * ) Notice: Subject to any disclaimer, the term of this patent is extended or adjusted under 35 U.S.C. 154(b) by 13 days.

(21) Appl. No.: 17/549,737

(22) Filed: Dec. 13, 2021

(65) Prior Publication Data
US 2023/0185670 A1  Jun. 15, 2023

(51) Int. Cl.
G06F 16/13 (2019.01)
G06F 11/14 (2006.01)

(52) U.S. Cl.
CPC .................. *G06F 11/1448* (2013.01)

(58) Field of Classification Search
CPC .... G06F 2201/84; G06F 3/065; G06F 16/128; G06F 16/137; G06F 16/1844; G06F 16/275
See application file for complete search history.

(56) References Cited

U.S. PATENT DOCUMENTS

2014/0115342 A1   4/2014  Ueda et al.
2016/0077926 A1*  3/2016  Mutalik .............. G06F 16/1844
                                              711/162

(Continued)

FOREIGN PATENT DOCUMENTS

JP   2021509188 A    3/2021
KR   102231058 B1    3/2021

OTHER PUBLICATIONS

International Search Report and Written Opinion for PCT Patent Application No. PCT/US22/51535, Mailed Apr. 3, 2023, 10 pages.

*Primary Examiner* — Etienne P Leroux
*Assistant Examiner* — Cindy Nguyen
(74) *Attorney, Agent, or Firm* — Compass IP Law PC (57) ABSTRACT

A method is described. The method includes processing first meta data for first units of stored content in a first storage system. The processing includes constructing a first tree of first nodes where first lower nodes represent fewer of the first units of stored content and first higher nodes represent more of the first units of stored content. The first nodes include respective first hash values calculated from the first meta data to represent the respective content of the respective first units of stored content that the first nodes respectively represent. The method includes processing second meta data for second units of stored content in a second storage system. The processing includes constructing a second tree of second nodes where second lower nodes represent fewer of the second units of stored content and second higher nodes represent more of the second units of stored content. The second nodes include respective second hash values calculated from the second meta data to represent the respective content of the respective second units of stored content that the second nodes respectively represent. The method includes comparing at least a subset of the first hash values with a corresponding at least a subset of the second hash values to ascertain sameness between the first and second units of stored content.

21 Claims, 9 Drawing Sheets (56) References Cited

U.S. PATENT DOCUMENTS

| | | | |
|---|---|---|---|
| 2020/0250201 A1* | 8/2020 | Cantwell | H04L 41/145 |
| 2021/0173840 A1 | 6/2021 | Yang | |
| 2021/0286768 A1 | 9/2021 | Kucherov et al. | |
| 2021/0303534 A1* | 9/2021 | Solan | G06F 16/2246 |
| 2022/0188288 A1* | 6/2022 | Dereszynski | G06F 16/2379 |

* cited by examiner

METHOD AND APPARATUS FOR MONITORING STORAGE SYSTEM REPLICATION

FIELD OF INVENTION

The field of invention pertains generally to the computing sciences, and, more specifically, to a method and apparatus for monitoring storage system replication.

BACKGROUND

With the emergence of big data, low latency access to large volumes of information is becoming an increasingly important parameter of the performance and/or capability of an application that processes or otherwise uses large volumes of information. Moreover, such information can be "mission critical" or have other levels of importance where their loss can be a serious disruption for the entities that rely on processing the information. As such, it is becoming increasingly difficult to rapidly change information while, at the same time, preserve the information while it is being changed.

FIGURES

A better understanding of the present invention can be obtained from the following detailed description in conjunction with the following drawings, in which.

DETAILED DESCRIPTION

Figure 1A:
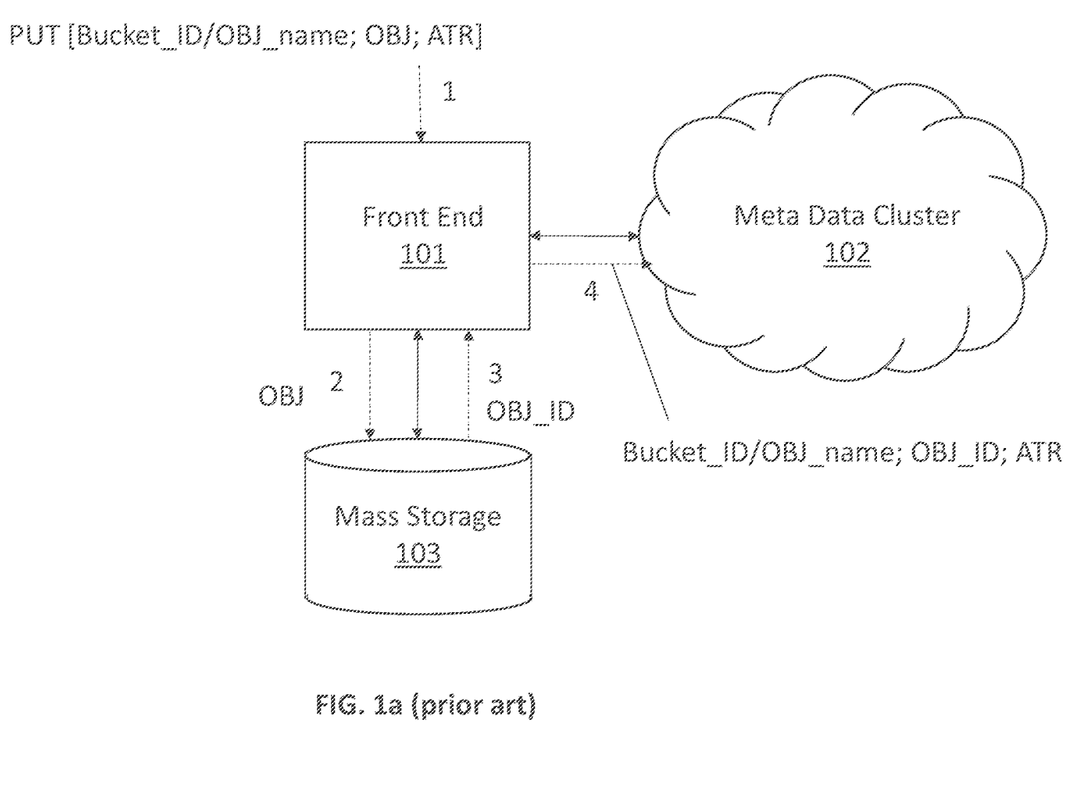
FIGS. 1a, 1b and 1c pertain to a prior art storage system.

FIG. 1a shows a prior art PUT command for, e.g., a large cloud based storage system that tracks attributes for the data items that it stores. The attributes correspond to meta data on a stored item and typically include some kind of descriptive and/or characterizing information about the stored item. Examples include, to name a few, how large the stored data item is, when the item was created, when the item was last changed, when the item was last accessed, information describing and/or characterizing the substantive content that is stored by the item, a security level of the item, an owner or the item, etc.

Here, front end 101 corresponds to a high-end computer or networked arrangement of high end computers that handle, e.g., large numbers of client requests that are received from a network such as the Internet and/or a large private network.

As observed in FIG. 1a, the front end 101 receives a PUT command 1 having a command syntax that specifies the item being placed into the storage system by name (OBJ_name). Here, the mass storage system 103 corresponds to an object storage system that puts/gets items to/from mass storage 103 based on an identifier (referred to as an object ID) of the item (which is referred to as an object) to be written/read to/from mass storage 103. Identifying data objects in mass storage 103 by an object ID is unlike traditional "file" based mass storage systems that can only identify a particular item by specifying a path through a directory of the file system.

In response to its receipt 1 of the PUT command, the front end 101 presents the object to be stored 2 to the mass storage system 103, which returns 3 an object ID for the object. Again, the client/user of the cloud storage system may refer to the object using its own naming convention ("name"), whereas, internally within the cloud storage service and within the mass storage system 103 specifically, the same object is identified by an object ID (which may be, e.g., a numeric string). Allowing users to name objects according to their own preferred naming convention allows for easier user integration with the cloud storage service while internally identifying objects with unique object IDs provides for, e.g., easier management and/or scalability of the mass storage system 103.

As observed in the syntax of the PUT command, the object name is preceded by a bucket identifier (Bucket_ID) that, e.g., associates the name of the object being PUT with a particular entity or owner that the object is associated with. As a basic example, assume the cloud storage service has a number of different corporate clients and the Bucket_ID corresponds to the identifier of the particular corporation that is submitting the PUT command (i.e., each of the different corporate customers has a unique, different Bucket_ID).

More generally, a bucket corresponds to some partition or subset of the objects that are stored in the mass storage system 103 (e.g., a particular user's objects corresponds to the bucket/subset of objects belonging to that user). Here, associating each object with its appropriate bucket allows for, e.g., different types of service for different customers (e.g., different buckets may keep different attribute/metadata content, have different allocated storage amounts, different guaranteed access times, etc.). Associating each object name with a bucket allows for different buckets/customers to name their objects with same names.

In response to the return 3 of the object_ID for the object being PUT, the front end 101 stores 4 the object's meta data into a meta data cluster 102. As observed in FIG. 1a, the meta data that is stored in the meta data cluster 102 for the object may include the bucket_ID for the object; the name of the object as identified by the user/customer (OBJ_name); the object_ID that was returned for the object by the mass storage system 103 (OBJ_ID); and any/all of the attributes (ATR) that were submitted with the object by the PUT command and any additional attributes that are to be associated with the object (e.g., as created by the cloud storage service).

Figure 1B:
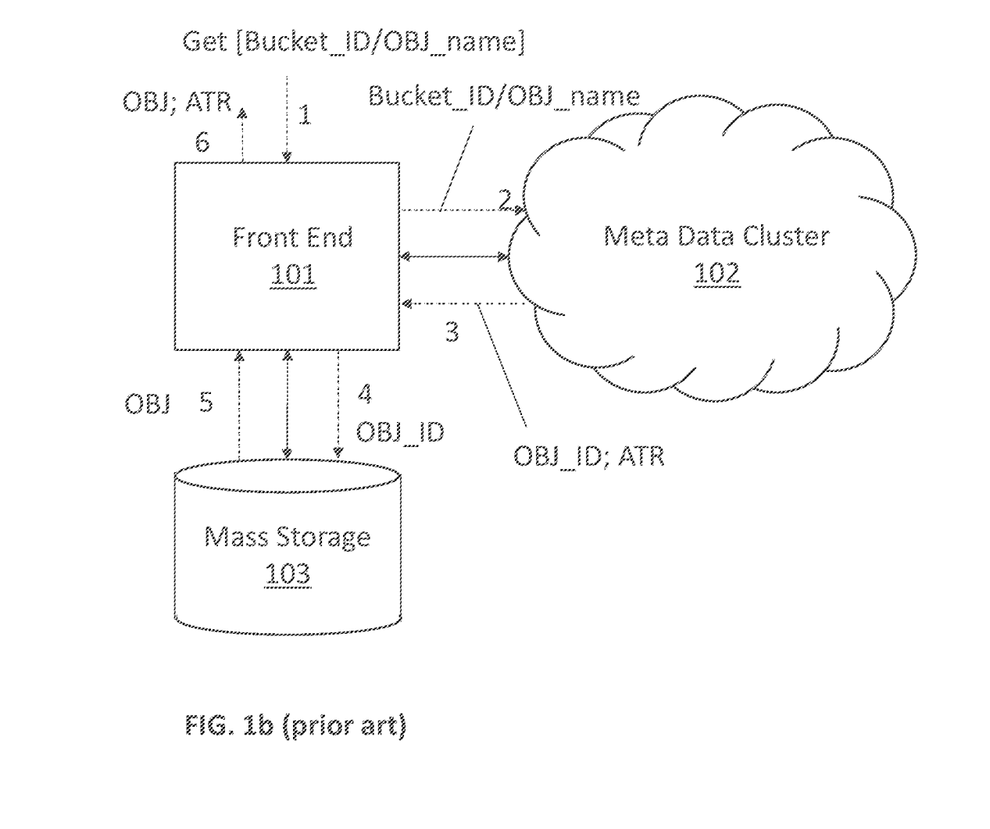

FIG. 1b shows a prior art GET command for the same object that was PUT into storage by the PUT command sequence of FIG. 1a. As observed in FIG. 1b, the GET command 1 syntax identifies the object to be fetched by bucket ID and object name. In response to its receipt of the GET command, the front end 101 provides 2 the Bucket_ID and object name to the meta data cluster 102 which uses them as look up parameters to fetch 3 the object ID and attributes for the object. The front end 101 provides 4 the returned object_ID to the mass storage system 103 which provides 5 the object. The front end 101 combines the attributes (ATR) that were returned 3 by the meta data cluster 102 with the returned object to provide a complete response 6 containing both the requested object and its attributes to the requesting user.

A MODIFY operation can also be executed for the object. The MODIFY operation follows a similar process flow as the aforementioned GET operation with a primary exception being that the MODIFY command from the user includes new information to write into the object. As such, when the object ID is provided 3 to the front end 101 by the meta data cluster 102, the front end 101 uses the object ID to write the new information into the object in mass storage 103. Unlike the GET operation, the object is not returned to the user. Attributes for the object may or may not be returned to the user pursuant to a MODIFY operation (depending on user preference and/or storage system design).

A DELETE operation can also be executed for the object. In the case of a DELETE operation, the front end 101 receives a DELETE command from the user that includes the object's Bucket_ID and name. The meta data 102 is then presented with the Bucket_ID and object name and is informed that the command is a DELETE operation. The meta data cluster 102 then marks its entry for the object as being deleted. The meta data cluster 102 then refuses to provide the object_ID for that object if any subsequent accesses for that object occur.

Storage systems have various performance metrics such as capacity (how much storage space exists), latency (how quickly the storage system is able to respond to read/write requests) and reliability (the degree to which a stored data item is guaranteed not to be lost).

Figure 1C:
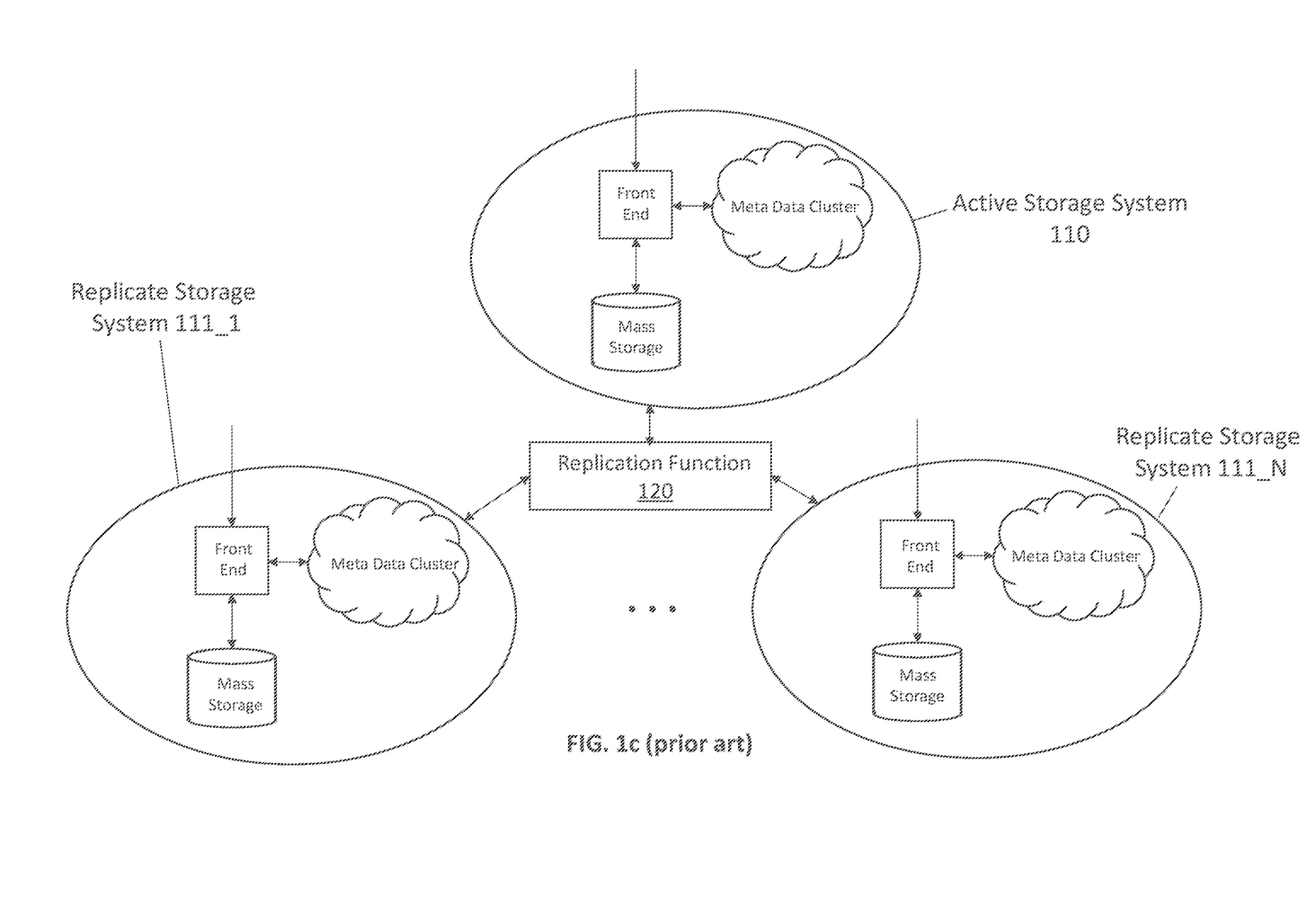

Referring to FIG. 1c, reliability is typically achieved with one or more replicate storage systems 111_1 through 111_N. That is, one or more copies of a primary or active storage system 110 are maintained. Here, as observed in FIG. 1c, the active storage system 110 and each of the replicant storage systems 111_1 through 111_N are implemented as separate instantiations of the storage system described above having a front end, meta data cluster and mass storage element.

As such, meta data content is built up within the respective meta data clusters of the replication storage systems 111_1 through 111_N no differently than the active storage system, e.g., according to the PUT, GET, MODIFY and DELETE operations described above. For example, when an object is modified in the active storage system 110, the meta data for the object's bucket and the mass storage within the active storage system are both modified. When the same object modification is made to the replication systems 111_1 through 111_N, the corresponding meta data and mass storage resources in each of the replication systems 111_1 through 111_N are modified according to the same modification process that was performed in the active storage system. A replication function 120 is designed into the storage system to replicate changes made to the active storage system 110 into the replication storage systems 111_1 through 111_N.

Should the active storage system 110 have a problem that results in loss of data (e.g., a hard disk drive crash), one of the replicate storage systems 111_1 through 111_N is called upon to retrieve the lost data. The greater the number N of replicate storage systems, the greater the probability that lost data can be recovered, which, in turn, corresponds to greater overall reliability of the system.

Maintaining the replicate storage systems 111_1 through 111_N, however, becomes more challenging for the replication function 120 as the capacity and activity of the active storage system grows. Specifically, it becomes more difficult to maintain a copy of an extremely large scale active storage system 110 (e.g., having a capacity in the hundreds of petabytes or higher) as the changes made to the active storage system 110 become more frequent and more diverse.

Said another way, it becomes increasingly difficult for the replication function 120 to keep the replication storage systems 111_1 through 111_N to "up to speed" with the state of the active storage system 110 as the active storage system processes 110 more and more changes in shorter and shorter time increments. As the replication function 120 begins to lag, the state of the replicate storage systems 111_1 through 111_N begin to reflect the state of the active storage system 110 farther and farther back in time making recovery from data loss in the active storage system 110 less likely.

Because of the challenges confronted to the replication function 120, large storage systems would additionally benefit from a function that monitors the performance of the replication function 120.

Figure 2:
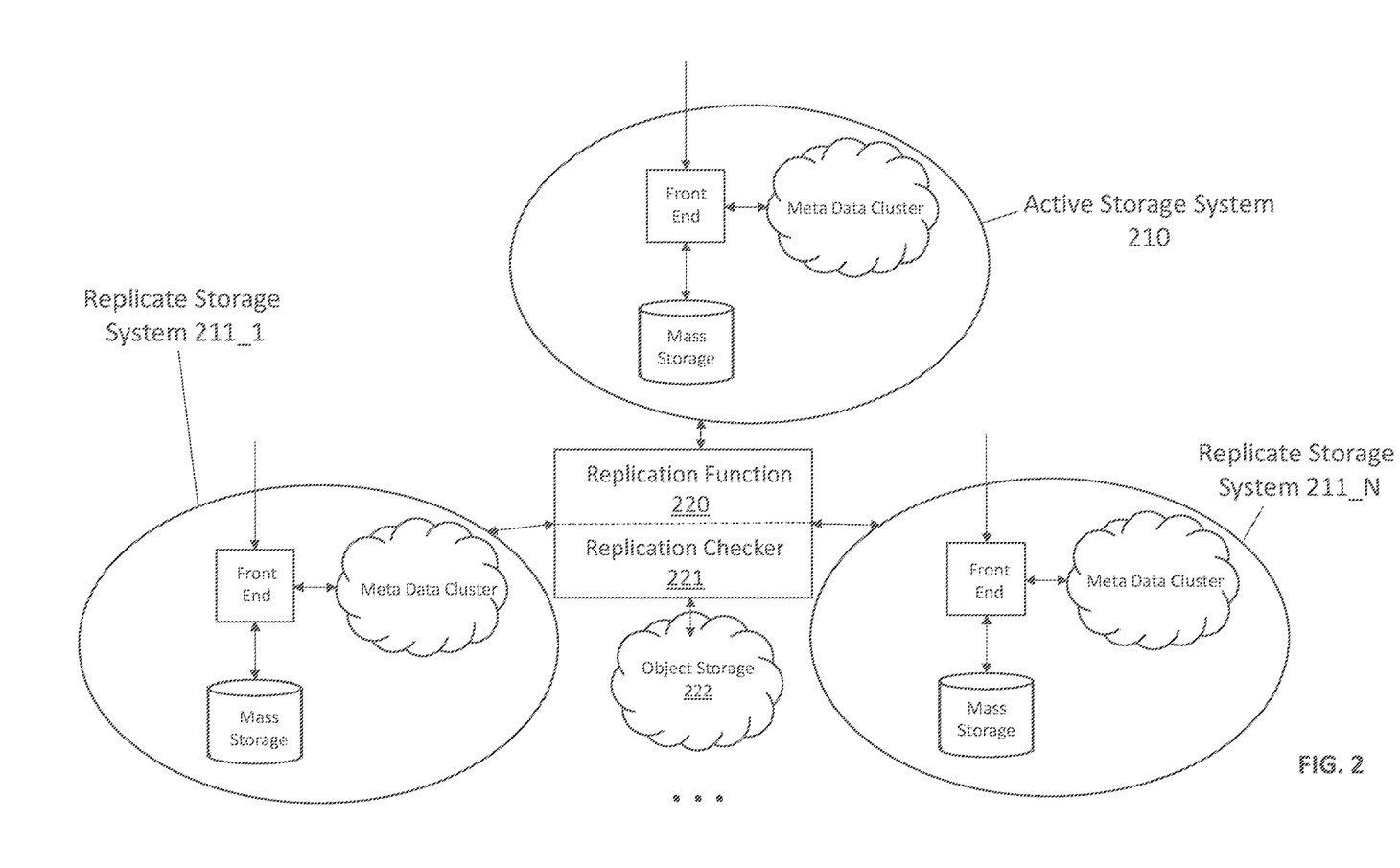
FIG. 2 depicts an improved storage system.

FIG. 2 therefore shows an improved storage system that includes a "replication checker" function 221 that monitors how closely the content of the replicate storage systems 211_1 through 211_N match the content of the active storage system 210. Notably, the algorithm(s) and/or architecture(s) by which the replication function 220 updates the replicate storage systems 211_1 through 211_N with changes made to the active storage system 210 can vary widely. The replication checker 221, by contrast, is largely indifferent as to the particular algorithms being applied by the replication function 220 and is focused instead on how closely the content of one replication system (e.g., system 211_1) matches the content of the active storage system 210 (or another replication system).

In this manner, the replication checker 221 monitors the performance of the replication function 220. If the content of the replication systems 211_1 through 211_N are determined by the replication checker 221 to closely match the content of the active storage system 210 over an extended runtime, the replication function 220 is deemed to be operating well. By contrast, if the replication checker 221 determines that the content of the replication systems 211_1 through 211_N are persistently and substantially different than the content of the active storage system 210, the replication function 220 is deemed to not be operating well.

The design and performance of the replication checker 221, however, faces challenges that are similar to those faced by the replication function 220. Mainly, as the capacity of the active and replication storage systems 210, 211 increase, it becomes increasingly difficult to determine their content (or at least, a bucket's worth of content). If the respective content of these storage systems 210, 211 becomes difficult to determine, determining their sameness likewise becomes difficult.

Therefore, a fast, lightweight mechanism for accurately accessing the content of a large storage system, or portion thereof, such as a bucket, would help the replication checker 221 quickly and accurately assess sameness between a bucket of information in the active storage system 210 and the corresponding (replicate) bucket of information within any of the replication systems 211.

With respect to the active and replication storage systems described above 210, 211, an observation is that, for the set of objects within any particular bucket, the content of the meta data for that bucket within the meta data cluster: 1) represents the state of the objects that are stored in mass storage for the bucket; and, 2) consumes significantly less storage space (has much smaller footprint) than the amount of storage space consumed by the bucket's objects in mass storage.

As described in more detail below, both of these characteristics can be taken advantage of by the replication checker 221 to quickly determine a set of values that represent the content of the objects in mass storage for an entire bucket. Here, for example, anytime an object for a particular bucket is added, modified or deleted, the content of the bucket's meta data in the meta data cluster will change. Thus, if a set of values are quickly computed from the content of the bucket's meta data, they can be used to represent the content/state of the objects for the bucket at the moment the values were computed.

Here, if a first set of values are computed for a particular bucket in the active storage system 210 and a second set of corresponding values are computed for the same bucket in one of the replication systems 211_1, the first and second sets of values can be quickly compared. If they are identical, the bucket in the replication storage system 211_1 is deemed to be a complete copy of the bucket in the active storage system 210. If they are different, the replication storage system 211_1 is deemed to not be fully synchronized with the active storage system 210.

By repeatedly/periodically performing these calculations, the replication checker 221 is able to continuously determine whether the replication storage system 211_1 is keeping pace with the active storage system 210. The same process/strategy is carried out for each of the other replicate storage systems.

Figure 3:
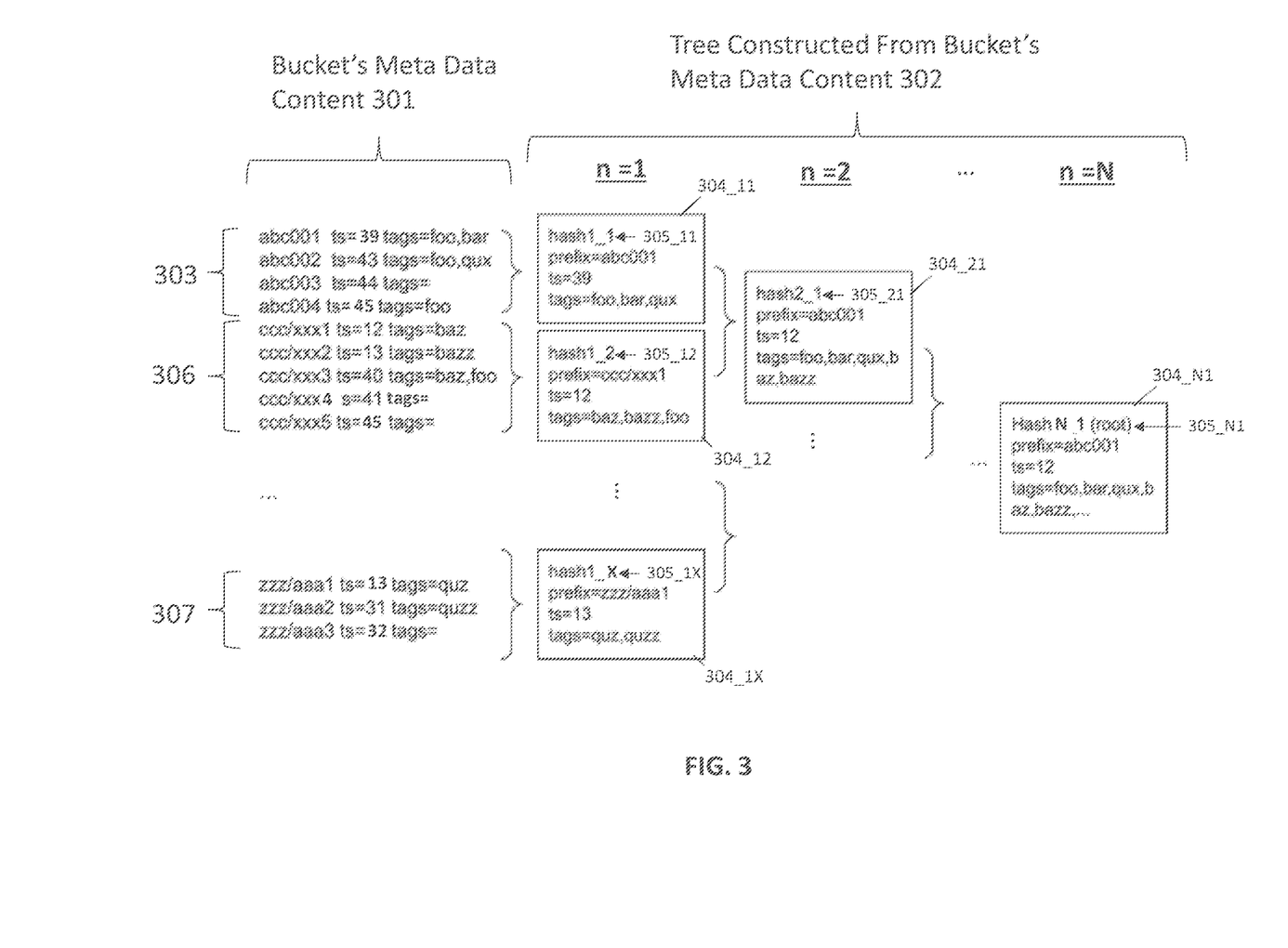
FIG. 3 depicts a tree that is constructed from meta data by the replication checker of FIG. 2.

FIG. 3 shows exemplary content of a bucket's meta data 301 and the data structures 302 that are constructed from the meta data 301. The details of FIG. 3 can correspond to the active storage system 210 or one of the replication storage systems 211. Here, as observed in FIG. 3, the meta data 301 can be viewed as an organized listing of entries where each entry corresponds to one of the bucket's objects or version of that object. In the particular embodiment of FIG. 3, the meta data entries are ordered alphanumerically based on object name.

In the particular embodiment of FIG. 3, versions of an object have the same root name of the object (e.g., "abc00" or "ccc/xxx") followed by a number which identifies the version (in other embodiments other conventions can be used to track different versions of an object, e.g., "_v1", "_v2" at the end of the object name). Here, it is assumed that the active storage system 210 is able to provide "snapshots" of the bucket's content. A snapshot is the state of the bucket's content at some particular moment of time in the past. In order to preserve past state of the bucket's content, the mass storage system keeps "versions" of a same object.

For example, if a particular object is modified at times t2, t5 and t7, mass storage will keep four versions of the object in order to support snapshots of the bucket at any time before t2 (version 1), between t2 and t5 (version 2), between t5 and t7 (version 3), and after t7 (version 4). Here, version 1 corresponds to the content of the object before the change made at t2, version 2 corresponds to the content of the object after the change made at t2, version 3 corresponds to the content of the object after the change made at t5, and, version 4 corresponds to the content of the object after the change made at t7. A similar lineage 303 is depicted in the bucket meta data 301 of FIG. 3 for object "abc00" which depicts the initial version (version 1) being created at timestamp (ts)=32, a change being made to the object at ts=43 (version 2), another change being made to the object at ts=44 (version 3), and another change being made to the object at ts=45 (version 4).

Each entry in the bucket's meta data 301 as depicted in FIG. 3 also includes, for the version of the object that the entry corresponds to, additional meta that is kept by the meta data cluster for the objects within the bucket (e.g., a security level of the object, an owner or the object, size of the object, etc.). Such remaining meta data is collectively referred to as "tags" in FIG. 3.

Also, although not specifically depicted in FIG. 3 for illustrative ease, in various embodiments, each entry in the meta data 301 also lists: 1) a different object ID for its corresponding version of the object (e.g., so the correct version of the object can be fetched for a particular snapshot); and, 2) a hash or checksum value calculated from the content of its corresponding version of the object (referred to herein as an "etag").

When an object is added to the bucket (which can be a PUT in the case of a wholly new object or a MODIFY in the case of on object being versioned) a new entry is created in the bucket's meta data 301 using the objects name and version number listed with the corresponding information recited above (object_ID, timestamp, etag and tags). When an object is deleted, the object's versioning history is preserved in the meta data 301 to support snapshots. However, the entry of the latest version of the object in the meta data 301 is marked "DELETE" (as described above, this mark is used to prevent subsequent access to the object, other than through a snapshot). In the exemplary bucket meta data 301 of FIG. 3, none of the observed object entries are marked as deleted but other entries that are not shown in FIG. 3 can be presumed to exist.

FIG. 3 also depicts a tree 302 of structures 304 with internal hash values 305 that are created from the meta data 301 by the checking function 221. As observed in FIG. 3, the structures 304 take the form of a tree where each structure 304 in the tree 302, hereinafter referred to as a "node", contains a hash value 305 and other content based on the portion of the meta data 301 entries represented by the node. As will be described in more detail below, the hash values 305 are used by the replication checker 221 to determine whether the bucket's content matches the content of the same bucket in another storage system.

At a lowest, first level of the tree (n=1), each of nodes 304_11, 304_12, . . . 304_1X, contain a hash value 305_11, 305_12, . . . 305_1X and other content that represents a specific segment of the meta data's ordered entries 301. Specifically, as observed in FIG. 3, node 304_11 represents segment 303 of the meta data's entries, node 304_12 represents segment 306 of the meta data's entries, . . . , and, node 304_1X represents segment 307 of the meta data's entries. Notably, each of these nodes 304_11, 304_12 and 304_1X happens to represent the meta data of only one object and its variants. This is coincidental for purposes of drawing simplification. Although various embodiments may choose to create a node for the meta data of only one object and its variants, other embodiments can construct nodes that represent the meta data of multiple objects and their variants.

At a second, next lowest level (n=2) of the tree 302, the content of each node is determined from the content of a group of immediately lower level nodes. As observed in FIG. 3, the content of node 304_21 is determined from first level nodes 304_11 and 304_12. The content of other nodes at the n=2 level would likewise be constructed from their own unique set of first level (n=1) nodes. For ease of illustration, node 304_21 only represents two lower level nodes 304_11 and 304_12. In practice, more n=1 level nodes could be represented by an n=2 node depending on the processing used to create the second n=2 nodes.

Note that because n=2 level node 304_21 represents n=1 nodes 304_11 and 304_12, the n=2 level node 304_21 can be said to represent segments 303 and 306 of the meta data 301. Notably, in various embodiments, the grouping of different segments 303, 306 of the meta data 301 by a node, at any level, is contiguous. That is, the grouped meta data segments form a continuous portion of the meta data 301.

This makes hash value based comparisons more straight forward to implement as described in more detail further below.

Continuing on to higher levels (n>2) of the tree 302, the process of forming higher level nodes that represent the content of immediately lower nodes continues until a root node 304_N1 is formed at the apex of the tree (n=N).

As described in more detail below, each node 304 in the tree contains a hash value 305 that is computed from content immediately beneath it (first level (n=1) nodes 304_11, 304_12 include hash values 305_11, 305_12 computed from the content of their corresponding meta data entries 303, 306; each second level node 304_21 includes a hash value 305_21 computed from the content of its corresponding underlying first level nodes 304_11, 304_12, etc.). The hash value 305_N1 contained by the root node 304_N1, therefore, represents the content of the meta data for the entire bucket 301.

The replication checker 221 therefore, in various embodiments, computes a first nodal tree 302 from the meta data content 301 of the active storage system 210 and computes a second nodal tree 302 from the meta data content 301 of one of the replication storage systems 211_1. The replication checker 221 then compares the hash value 305_N1 in the root node 304_N1 of both trees. If the hash value 305_N1 is the same in both root nodes, the meta data content 301 for the bucket in both storage systems 210, 211_1 are deemed to be identical. The replication checker 221 can then compare the roots nodes of the trees from the other replication systems and quickly determine which replication systems are synchronized with the active storage system and which ones are not.

Importantly, the constructing of the trees and the comparing of their root node hash values entails lightweight/fast processing (as described in more detail further below). By so doing, the constructing and comparing can be performed in small amounts of time thereby resulting in fast ascertainment of how well the replication systems 211 are synchronized with the active storage system 210 over extended runtimes.

In practice, the hash value 305_N1 in the root node 304_N1 of each of the replication systems 211 will oftentimes not match the hash value 305_N1 of the root node 304_N1 of the active storage system 210. Again, as discussed above, it is challenging for the replication function 220 to keep the replication storage systems 211 fully in synch with the active storage system 210 at all times. The tree structure 302, therefore, additionally allows the replication tracker 221 to dig further into the differences between the content of a particular replication storage system 211 and the content of the active storage system 210.

For example, consider a scenario where the hash value 305_N1 in the root node 304_N1 of a particular replication storage system 211_1 does not match the hash value 305_n1 in the root node 304_N1 of the active storage system 210. In this case, the replication checker 221 can begin comparing corresponding nodes at lower levels to gain a deeper understanding as to where the differences are in the namespace of the meta data 301 and/or how severe the differences are. For example, if the tree 302 is structured such that there are two nodes at the N-1 level, the replication checker 221 could compare the N-1 nodes in the replication storage system 211_1 against their corresponding N-1 nodes in the active system 210.

If the replication checker 221 discovers that the hash value of one of the N-1 level nodes in the replication system's tree matches its counterpart in the active system's tree, the replication checker 221 can conclude that approximately half of the bucket in the replication system (the half represented by the nodes with matching hash value) is fully synchronized with the active system. If the replication checker continues to "dig down" through lower levels of the tree and discovers that at each level, all nodes except one match their counterpart in the active system, the replication checker 221 can further conclude that large portions of the other half of the bucket are substantially synchronized with the active system.

In various embodiments, the hash algorithm is designed to generate different values for content that is nearly identical but for only a small amount of information. For example, in various embodiments the hash algorithm is designed to generate different hash values for content that is identical, except for one bit.

In this case, any difference in corresponding meta data content between the replication and active systems will generate a different hash value in the corresponding lowest leaf nodes (n=1) of their respective tree structures. These different hash values are then part of the content that is hashed over to create the respective next level (n=2) nodes in the true, producing different hash values at the n=2 nodes. In this manner, any difference in meta data content between the active and replication systems will generate hash differences in corresponding tree nodes that "ripple up" from the lowest/leaf (n=1) level all the way up to the root node (n=N).

In this approach, just a single bit difference in the meta data for one of the objects as between the two systems will result in different hash values at the (n=N) root node level. However, in this same scenario, the replication checker 221 can "drill down" into the tree structure, starting at the root node and follow the path of nodes having mis-matching hash value with its counterpart. In the case of an error of only one bit in the meta data of only one object, the number of nodes having matching values with its counterpart will expand drilling down from the root node toward the leaf nodes. Eventually, all nodes at the n=2 level will have hash values that match with their counterpart except for the leaf node pair that represents the objects with differing meta data.

If, in another case, there are a few other objects associated with other leaf nodes whose meta data mismatches, these other leaf nodes will also have mismatching hash values with their counterparts. Mismatching hash values as between corresponding nodes will then continue to ripple upward into the tree. In this case, when the replication checker 221 drills down through the tree it will continue to see expansion of matching hash values at corresponding nodes at deeper levels (lower n value) of the tree. However, a few more threads of mismatching hash values will emerge that lead to the leaf nodes having objects with mismatching content.

Here, the comparing of the hash values of corresponding tree nodes can be performed very quickly. As such, ascertaining how closely the content of a replication storage system matches the content of an active storage system consumes only a small amount of time and can performed with great precision as to which meta data entries are different. Additionally, as described above, the replication checker 221 is free to determine how much difference is tolerated as acceptable vs. how much difference is not tolerated as unacceptable.

For example, criteria can also be established for determining whether the synchronization of the replication bucket is acceptable or not based on the tree comparisons (e.g., some number of nodes with mismatching hashes are permitted for each level).

As observed in the particular embodiment of FIG. 3, besides a hash value 305 computed from the lower level content that a node 304 represents, each node also includes: 1) the name of the first object in the alphanumeric order of the set of objects of the meta data content that the node represents ("prefix"); 2) the oldest (farthest back in time) timestamp in the meta data content that the node represents ("ts"); 3) the set of unique tags in the meta data content that the node represents ("tags").

The name of the first object ("prefix") allows the replication checker 221 to quickly ascertain which node in the tree 302 represents the meta data for a particular object of interest. For example, referring to FIG. 3, if the replication checker 221 is interested in object "abc004", the replication checker will be able to determine that, at the first level (n=1), node 304_11 represents that object by comparing the prefixes of nodes 304_11 and 304_12.

The timestamp, in conjunction with the ability to determine which node represents meta data content for a particular object, allows the replication checker to check upon other background processes besides replication. For example, if a limit is set on how far back in time a snapshot can be saved, a background process can physically delete from the bucket's mass storage all objects whose timestamp is farther back in time than the limit. In this case, the entries for all such objects can also be physically deleted from the bucket's meta data.

Thus, the replication checker 221 (now, replication and lifetime checker 221) can determine if any such object has been deleted by inquiring into a node of the tree that would represent the physically deleted object. If the timestamp for the object, or an older (even farther back in time) timestamp is recorded in the node, the replication and lifetime checker 221 will understand that the object has not yet been deleted from system (replication or active).

Figure 4:
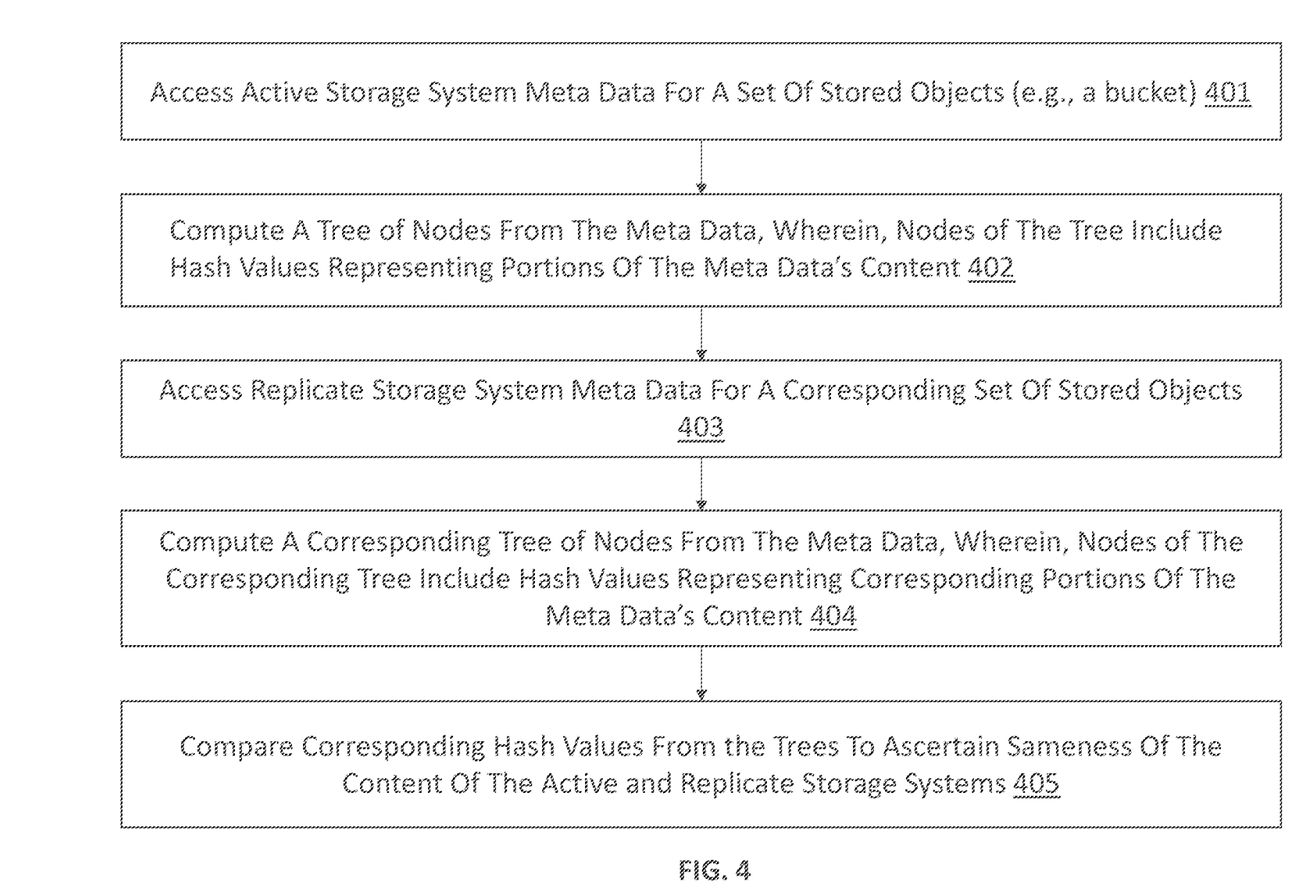
FIG. 4 depicts a method performed by the replication checker of FIG. 2.

FIG. 4 depicts a process performed by a replication checker as described above. As observed in FIG. 4, an active storage system's meta data is accessed for a set of stored objects (e.g., a bucket) 401. A tree of nodes is computed from the meta data, where, nodes of the tree Include hash values representing portions of the meta data's content 402. A replicate storage system's meta data is accessed for a corresponding set of stored objects 403. A corresponding tree of nodes is computed from the replication system's meta data, where, nodes of the corresponding tree include hash values representing corresponding portions of the meta data's content 404. The corresponding hash values from the trees are compared to ascertain sameness of the content of the active and replicate storage systems 405. The process is continually repeated (e.g., periodically) across each of the active storage system and the replication storage systems so that the sameness of the replication systems as compared to the active storage system are continuously monitored.

Note that although the process of FIG. 4 is directed to an object storage system, the approach can also be directed to a file system in which the stored units and their versions as reflected in the meta data are files and not objects. Thus, the replication checker described herein is not limited only to object storage but can be extended to file storage. As such, the process of FIG. 4 can be more generally directed to the processing of meta data of stored units of information (objects, files, etc.) to gain quick insight into the content of the stored units themselves.

Figure 5:
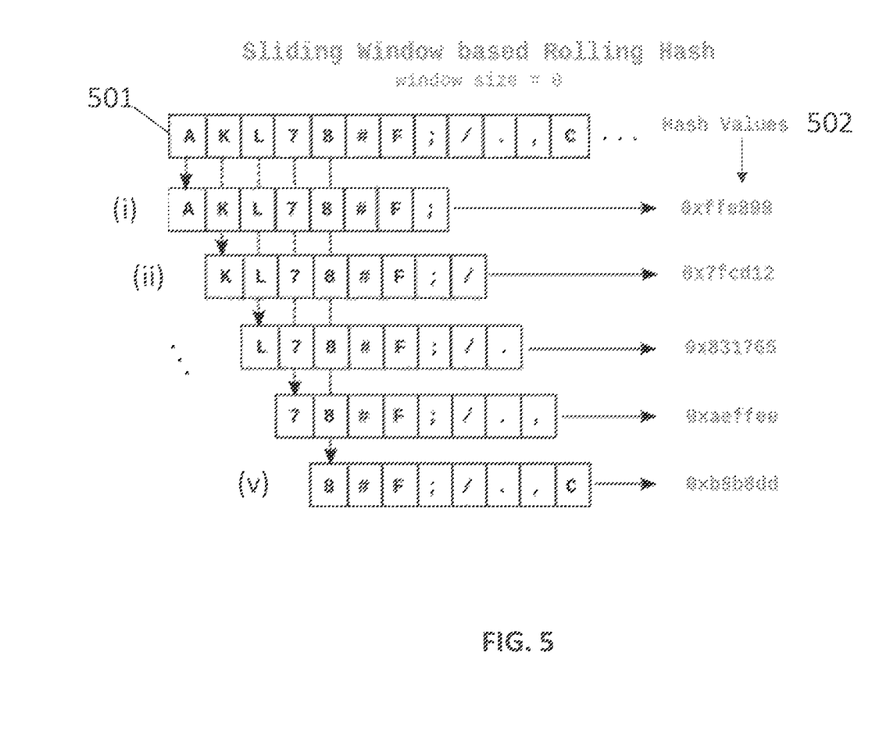
FIG. 5 depicts a rolling hash computation.

FIG. 5 shows one approach for calculating the hash values for a particular node in a tree as described above. The approach of FIG. 5, as is known in the art, is referred to as a rolling hash computation approach. Content 501 can be viewed as a portion of the in order, byte-by-byte ("serialized") content of the meta data or lower tree node that a hash value is being computed from. A mathematical computation is performed (hash operation) on a "window" of the content (in the exemplary approach of FIG. 5, the window size is eight elements for each computation).

A succession of hash operations are then performed that correspond to different, consecutive (sliding) positions of the window. FIG. 5 shows five such computations (i) through (v) as the window slides to the right. Each sliding window position corresponds to the generation of a new hash value 502. Notably, the forward movement of the sliding window calls in only one new value at the expense of the oldest value in the window. The calling in of one new value, the dropping of an already existing value and the performing of a hash computation on the resultant can be performed with very little compute time (the hash calculations are performed very quickly).

Also, note that the hash computations for a single tree node (e.g., over a block of meta data entries for a leaf node, or immediately lower lever tree nodes for a higher lever node) can generate multiple hash values 501 for that node. As such, each separate hash value in FIG. 3 (e.g., hash value 305_11 or hash value 305_21, etc.) is actually a series of hash values 501 as observed in FIG. 5. Sameness between two corresponding nodes of different storage systems is then performed by comparing the set of hash values that were generated for that node. If the set of hash values match between the two nodes, the two nodes are deemed to represent identical meta data content.

Figure 6:
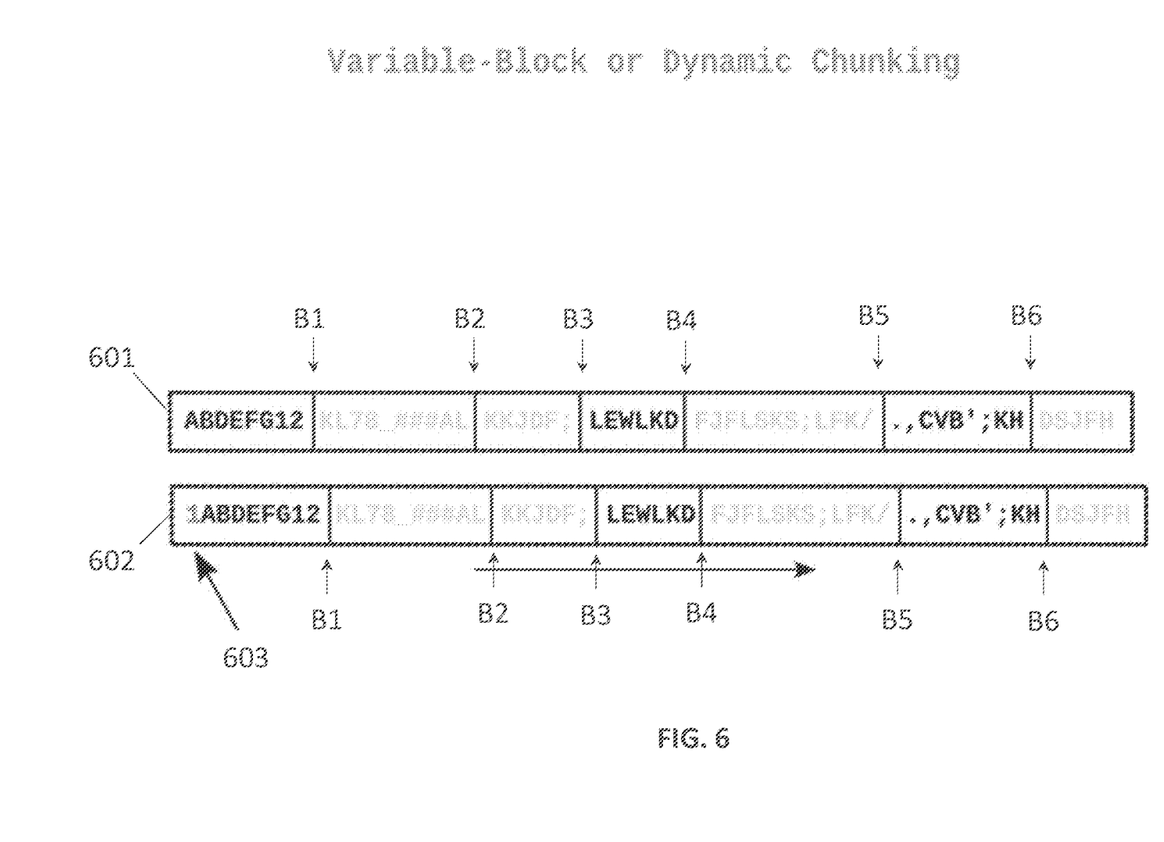
FIG. 6 depicts dynamic chunking of a rolling has computation.

FIG. 6 shows a mechanism for ensuring that the hash calculations for two different nodes are aligned so that the hash values they generate are directly comparable ("dynamic chunking"). Here, content 601 corresponds to the serialized content of the meta data or lower tree node for a first storage system that a hash operation is being performed upon and content 602 correspond to the serialized content of the meta data or lower tree node for a second storage system that a hash operation is being performed upon. Notably, content 602 has one extra element 603 than content 601.

As just one example, content 602 could correspond to meta data content of the active storage system while content 601 could correspond to meta data content of a replication system. Additional element 603 could correspond to a new object that has been added to the active storage system that the replication system has not yet been updated with (as depicted, the new object 603 is at the very beginning of the alphanumeric order but it could be anywhere in the content).

Dynamic chunking uses a same fixed value in the content (e.g., a "0") as a border marker "B" and computes hash values from the content in between border markers. As observed in FIG. 6, the same value appears four times in content 601 resulting in four distinct border markers B1 through B6. The same corresponding markers also appear in content 602 but their location is misaligned with respect to content 601 because of the insertion of the extra element 603. Nevertheless, by computing hash values from the content in between the border markers, the sequence of hash values 502 produced by the hash operations over the different content sets 601, 602 will yield mostly same hash values (the content forward of B1 is the same in both content sets 601, 601 which will yield identical hash results for all hash values forward of B1). Note that the amount of content between borders can vary which can be adapted for by changing window size for the calculation of a specific hash value (e.g., the size of the window is adjusted to be the same as the amount of content between borders).

Referring back to FIG. 2, the architecture of FIG. 2 could be implemented in various ways. According to a number of approaches, as discussed above, the mass storage components of the active 210 and replicate 211 storage systems are implemented with object storage. In further embodiments, these object mass storage elements are each implemented as the object storage system described in U.S. Pat. No. 9,524,302 entitled "Distributed Consistent Database Implementation Within An Object Store", having application Ser. No. 14/198,486 and filing date of Mar. 5, 2014 and assigned to Scality S.A. of Paris, France and which is hereby incorporated by reference. In other embodiments, one or more of the mass storage components of storage systems 210, 211 are implemented with a commercially available "cloud" object storage system (e.g., Amazon Simple Storage Service (Amazon S3) from Amazon, Google Cloud Storage from Google, and/or Azure Blob Storage from Microsoft).

FIG. 2 also indicates that the replication checker 221 has access to its own object storage system 223. In an embodiment, the replication checker 221 stores the trees and their corresponding nodes in object storage system 222. Here, upon the replication checker calculating a new tree and its nodal content, the replication checker 221 stores the newly calculated tree and nodes in object storage system 223. When comparing the nodes of different trees, the replication checker reads one or both trees from the object storage system 222 and then makes the comparison. In various embodiments, the object storage system 222 is implemented as described in the '302 patent mentioned above. In another embodiment, object storage system 222 is implemented with a commercially available cloud service (e.g., Amazon Simple Storage Service (Amazon S3) from Amazon, Google Cloud Storage from Google, and/or Azure Blob Storage from Microsoft).

In various embodiments, the front end component of one or more of the active and replication storage systems 210, 211 are implemented with a compute cloud service (e.g., a compute engine provided by any of Amazon AWS, Google Cloud or Microsoft Azure) or, e.g., a proprietary compute system/engine. In further embodiments, the front end components are designed to provide a file system interface and experience to the user(s) even though object storage is being used in the back end as the mass storage component. That is, the logic of the front end component is designed to receive file system requests formatted according to a file system interface (e.g., any of NFSv3, NFSv4, SMB2, SMB3, FUSE, CDMI, etc.)), where, e.g., the specified filepaths in the requests are treated like or used to calculate an object name. The system then operates PUT, GET, MODIFY and DELETE operations as described above. The front end component of one or more of the active and replication storage systems 210, 211 can offer file system user experiences with or without raw object storage interfaces/user experiences depending on implementation.

In various embodiments, the meta data cluster component of each of the active and replication storage systems 210, 211 is implemented with a database. A database includes a tree-like structure (e.g., a B− tree, a B+ tree, or an LSM tree) at its front end which allows sought for items to be accessed very quickly (a specified item can be accessed after only a few nodal hops through the tree). Additionally, a database is typically structured as a table which allows for straightforward organization of "entries" each having a set of characteristics such as the meta data entries having a set of characteristics for a particular object and its version as described above. In various embodiments, a commercially available database cloud service is used to implement each of the meta data cluster components such as any of Amazon Aurora, Amazon DynamoDB and Amazon RDS offered by Amazon; Cloud SQL offered by Google; Azure SQL Database and/or Azure Cosmos DB offered by Microsoft. Other possible cloud database services include MongoDB, FoundationDB and CouchDB.

In various embodiments, the replication function 220 and replication checker 221 is communicatively coupled to each of the active and replication storage systems 210, 211 (in particular the replication checker 221 is coupled to their respective meta data cluster components) through one or more networks such as any of a local area network, wide area network, private network and public network (such as the Internet).

Figure 7:
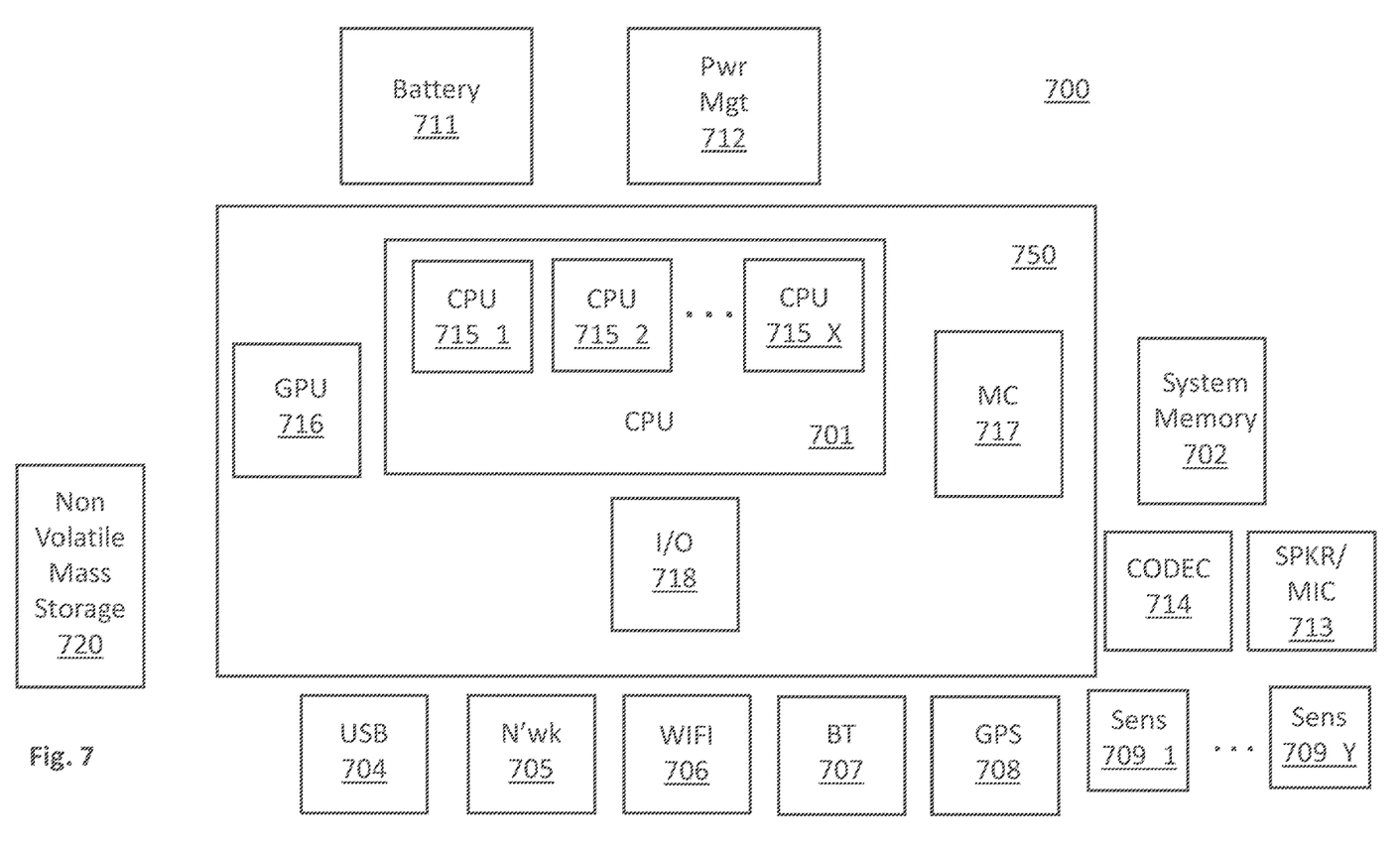
FIG. 7 shows a computing system.

FIG. 7 provides an exemplary depiction of a computing system 700. Any of the aforementioned functions, storage systems and/or cloud services can be constructed, e.g., from networked clusters of computers having at least some of the components described below and/or networked clusters of such components (e.g., a cluster of CPUs communicatively coupled to a cluster of SSDs).

As observed in FIG. 7, the basic computing system 700 may include a central processing unit (CPU) 701 (which may include, e.g., a plurality of general purpose processing cores 715_1 through 715_X) and a main memory controller 717 disposed on a multi-core processor or applications processor, main memory 702 (also referred to as "system memory"), a display 703 (e.g., touchscreen, flat-panel), a local wired point-to-point link (e.g., universal serial bus (USB)) interface 704, a peripheral control hub (PCH) 718; various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_Y (e.g., one or more cameras), a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a main memory controller 717 and a peripheral control hub (PCH) 718 (also referred to as I/O controller and the like). The general purpose processing cores 715 typically execute the operating system and application software of the computing system. The graphics processing unit 716 typically executes graphics intensive functions to, e.g., generate graphics information that is presented on the display 703. The main memory controller 717 interfaces with the main memory 702 to write/read data to/from main memory 702. The power management control unit 712 generally controls the power consumption of the system 700. The peripheral control hub 718 manages communications between the computer's processors and memory and the I/O (peripheral) devices.

Each of the touchscreen display 703, the communication interfaces 704-707, the GPS interface 708, the sensors 709, the camera(s) 710, and the speaker/microphone codec 713, 714 all can be viewed as various forms of I/O (input and/or output) relative to the overall computing system including, where appropriate, an integrated peripheral device as well (e.g., the one or more cameras 710). Depending on implementation, various ones of these I/O components may be integrated on the applications processor/multi-core processor 750 or may be located off the die or outside the package of the applications processor/multi-core processor 750. The computing system also includes non-volatile mass storage 720 which may be the mass storage component of the system which may be composed of one or more non-volatile mass storage devices (e.g. hard disk drive, solid state drive, etc.). The non-volatile mass storage 720 may be implemented with any of solid state drives (SSDs), hard disk drive (HDDs), etc.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard wired interconnected logic circuitry (e.g., application specific integrated circuit (ASIC) logic circuitry) or programmable logic circuitry (e.g., field programmable gate array (FPGA) logic circuitry, programmable logic device (PLD) logic circuitry) for performing the processes, or by any combination of program code and logic circuitry.

Elements of the present invention may also be provided as a machine-readable medium for storing the program code. The machine-readable medium can include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
constructing a first tree from first meta data that describes first stored content in a first storage system, the first tree having a hierarchy of levels of nodes, with successively higher levels of the hierarchy having fewer nodes, where a node at a lowest level is computed as a hash of meta data about a first object of the first storage system and variants of the first object as changed over time, and where each successively higher level of the hierarchy is computed as a hash of multiple nodes from the level below, representing successively more stored content of the first storage system;
constructing a second tree from second meta data that describes second stored content in a second storage system, the second tree having the hierarchy of nodes, with successively higher levels of the hierarchy having fewer nodes, where a node at a lowest level is computed as a hash of meta data about a second object of the second storage system and variants of the second object as changed over time, and where each successively higher level of the hierarchy is computed as a hash of multiple nodes from the level below, representing successively more stored content of the second storage system, and wherein, the first storage system and second storage system support snapshots; and,
comparing a subset of the nodes of the first tree with a corresponding subset of the nodes of the second tree to ascertain sameness between the first stored content represented by the subset of the nodes of the first tree and the second stored content represented by the subset of the nodes of the second tree, to further ascertain sameness between the first storage system and the second storage system.

2. The method of claim 1 wherein the first storage system is an active storage system, and the second storage system is a replicate storage system.

3. The method of claim 1 further comprising performing first rolling hash operations over the first meta data to calculate the nodes of the first tree and performing second rolling hash operations over the second meta data to calculate the nodes of the second tree.

4. The method of claim 3 wherein the first rolling hash operations comprise dynamic chunking and the second rolling hash operations comprise dynamic chunking.

5. The method of claim 1 wherein comparing the subset of the nodes of the first tree with the corresponding subset of the nodes of the second tree comprises first comparing nodes at a highest level of the hierarchy in the first tree and the second tree, and in response to detecting a difference between nodes in higher levels of the hierarchy, comparing nodes at a next lower level of the hierarchy.

6. The method of claim 5 wherein comparing the nodes at the next lower level of the hierarchy comprises detecting a difference at a level of the hierarchy between the first tree and the second tree, and comparing nodes at a next lower level of the hierarchy to determine a path of nodes having a mismatch to the lowest level of the hierarchy.

7. The method of claim 1 wherein the node at the lowest level is computed as a hash of meta data about multiple first objects of the first storage system and respective variants of the multiple first objects.

8. A machine readable storage medium containing program code that when processed by one or more processors of one or more computer systems causes a method to be performed, the method comprising:
constructing a first tree from first meta data that describes first stored content in a first storage system, the first tree having a hierarchy of levels of nodes, with successively higher levels of the hierarchy having fewer nodes, where a node at a lowest level is computed as a hash of meta data about a first object of the first storage system and variants of the first object as changed over time, and where each successively higher level of the hierarchy is computed as a hash of multiple nodes from the level below, representing successively more stored content of the first storage system;
constructing a second tree from second meta data that describes second stored content in a second storage system, the second tree having the hierarchy of nodes, with successively higher levels of the hierarchy having fewer nodes, where a node at a lowest level is computed as a hash of meta data about a second object of the second storage system and variants of the second object as changed over time, and where each successively higher level of the hierarchy is computed as a hash of multiple nodes from the level below, representing successively more stored content of the second storage system, and wherein, the first storage system and second storage system support snapshots; and,
comparing a subset of the nodes of the first tree with a corresponding subset of the nodes of the second tree to ascertain sameness between the first stored content represented by the subset of the nodes of the first tree and the second stored content represented by the subset of the nodes of the second tree, to further ascertain sameness between the first storage system and the second storage system.

9. The machine readable storage medium of claim 8 wherein the first storage system is an active storage system, and the second storage system is a replicate storage system.

10. The machine readable storage medium of claim 8 further comprising performing first rolling hash operations over the first meta data to calculate the nodes of the first tree and performing second rolling hash operations over the second meta data to calculate the nodes of the second tree.

11. The machine readable storage medium of claim 10 wherein the first rolling hash operations comprise dynamic chunking and the second rolling hash operations comprise dynamic chunking.

12. The machine readable storage medium of claim 8 wherein comparing the subset of the nodes of the first tree with the corresponding subset of the nodes of the second tree comprises first comparing nodes at a highest level of the hierarchy in the first tree and the second tree, and in response to detecting a difference between nodes in higher levels of the hierarchy, comparing nodes at a next lower level of the hierarchy.

13. The machine readable storage medium of claim 12 wherein comparing the nodes at the next lower level of the hierarchy comprises detecting a difference at a level of the hierarchy between the first tree and the second tree, and comparing nodes at a next lower level of the hierarchy to determine a path of nodes having a mismatch to the lowest level of the hierarchy.

14. The machine readable storage medium of claim 8 wherein the node at the lowest level is computed as a hash of meta data about multiple first objects of the first storage system and respective variants of the multiple first objects.

15. An apparatus, comprising:
one or more computers, each of the one or more computers having one or more processors, the one or more processors having access to memory and/or storage resources that store program code to be processed by the one or more processors to perform a method comprising:
constructing a first tree from first meta data that describes first stored content in a first storage system, the first tree having a hierarchy of levels of nodes, with successively higher levels of the hierarchy having fewer nodes, where a node at a lowest level is computed as a hash of meta data about a first object of the first storage system and variants of the first object as changed over time, and where each successively higher level of the hierarchy is computed as a hash of multiple nodes from the level below, representing successively more stored content of the first storage system;
constructing a second tree from second meta data that describes second stored content in a second storage system, the second tree having the hierarchy of nodes, with successively higher levels of the hierarchy having fewer nodes, where a node at a lowest level is computed as a hash of meta data about a second object of the second storage system and variants of the second object as changed over time, and where each successively higher level of the hierarchy is computed as a hash of multiple nodes from the level below, representing successively more stored content of the second storage system, and wherein, the first storage system and second storage system support snapshots; and,
comparing a subset of the nodes of the first tree with a corresponding subset of the nodes of the second tree to ascertain sameness between the first of stored content represented by the subset of the nodes of the first tree and the second stored content represented by the subset of the nodes of the second tree, to further ascertain sameness between the first storage system and the second storage system.

16. The apparatus of claim 15 wherein the first storage system is an active storage system, and the second storage system is a replicate storage system.

17. The apparatus of claim 15 further comprising performing first rolling hash operations over the first meta data to calculate the nodes of the first tree and performing second rolling hash operations over the second meta data to calculate the nodes of the second tree.

18. The apparatus of claim 17 wherein the first rolling hash operations comprise dynamic chunking and the second rolling hash operations comprise dynamic chunking.

19. The apparatus of claim 15 wherein comparing the subset of the nodes of the first tree with the corresponding subset of the nodes of the second tree comprises first comparing nodes at a highest level of the hierarchy in the first tree and the second tree, and in response to detecting a difference between nodes in higher levels of the hierarchy, comparing nodes at a next lower level of the hierarchy.

20. The apparatus of claim 19 wherein comparing the nodes at the next lower level of the hierarchy comprises detecting a difference at a level of the hierarchy between the first tree and the second tree, and comparing nodes at a next lower level of the hierarchy to determine a path of nodes having a mismatch to the lowest level of the hierarchy.

21. The apparatus of claim 15 wherein the node at the lowest level is computed as a hash of meta data about multiple first objects of the first storage system and respective variants of the multiple first objects.

\* \* \* \* \*